UNITED STATES PATENT OFFICE.

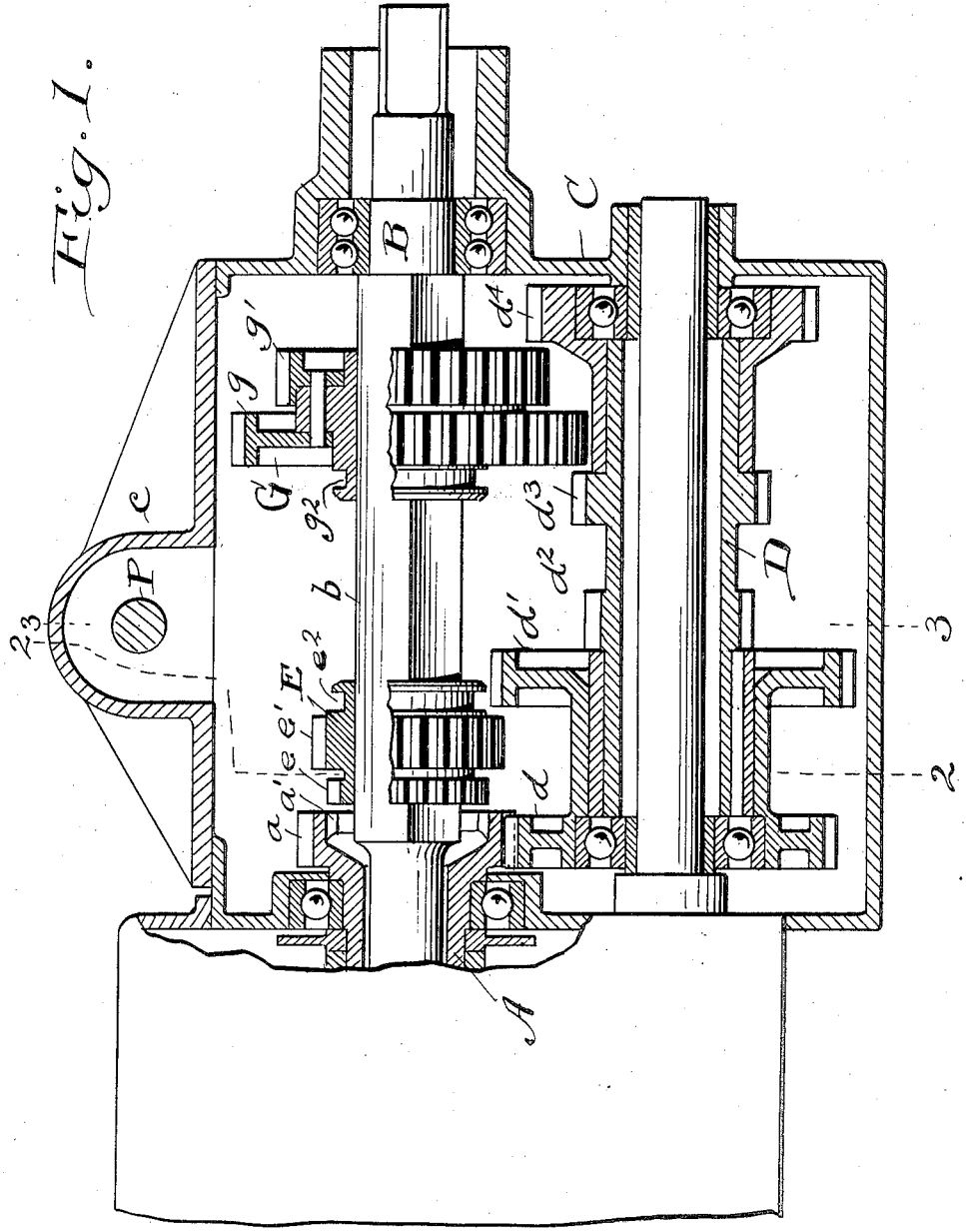

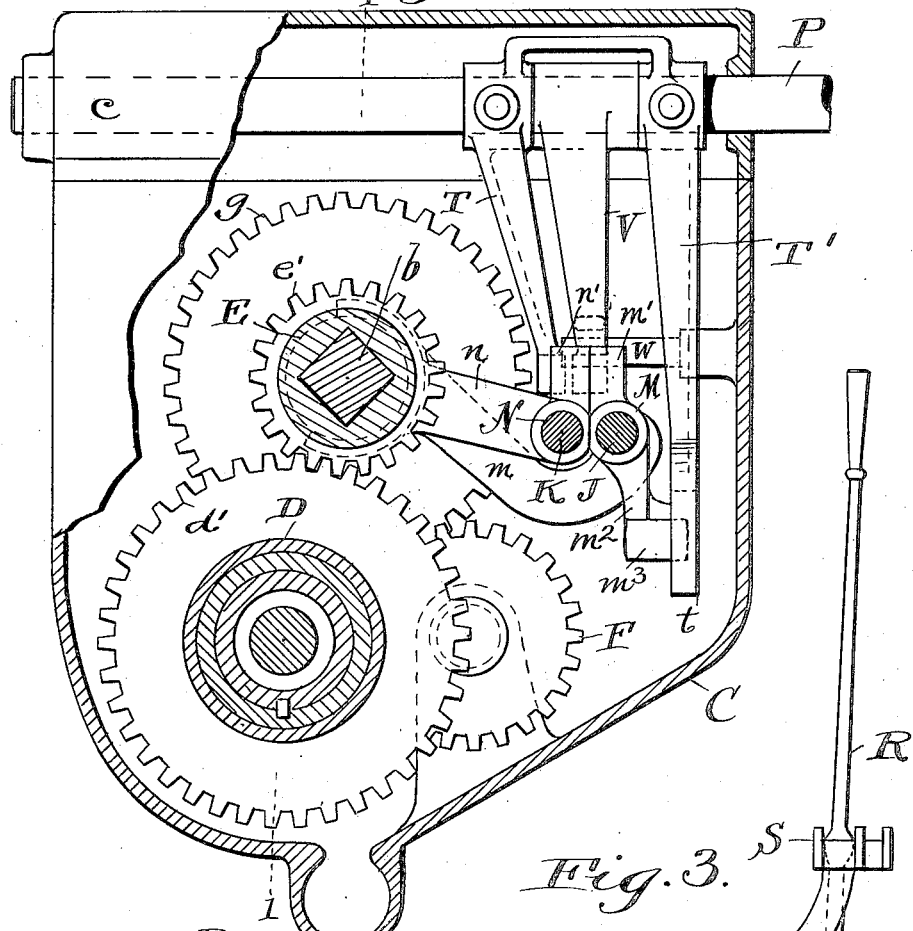

ALANSON P. BRUSH, OF FLINT, MICHIGAN.

TRANSMISSION-GEAR-SHIFTING MECHANISM.

1,057,617.	Specification of Letters Patent.	Patented Apr. 1, 1913.

Application filed February 15, 1911. Serial No. 608,667.

*To all whom it may concern:*

Be it known that I, ALANSON P. BRUSH, a citizen of the United States, residing at Flint, in the county of Genesee and State of Michigan, have invented a certain new and useful Improvement in Transmission-Gear-Shifting Mechanism, of which the following is a full, clear, and exact description.

This invention is particularly an improvement in the mechanism for shifting the gears in the kind of transmission mechanism for automobiles which is organized to give four speeds forward and the "reverse." With transmission mechanisms of this sort, there are obviously five positions into which the hand lever must be moved from the neutral position, in order to produce the different intermeshing of gears for giving the four speeds forward and the "reverse." In all of the prior constructions, however, in which the hand lever for shifting gears in this transmission mechanism moves forward and backward in two planes only, this lever in moving to the positions required for making any of the five forward connections moves the same distance from the neutral point forward or backward, as the case may be; and in moving to the "reverse" position it moves twice as far and sometimes even farther. With the construction in which the present invention is embodied, however, the lever in moving from the neutral point to the "reverse" position moves no farther than it does in moving forward or backward from the neutral point to any other operative position, and as a result said lever in moving to two of the forward positions moves only one-half as far.

It is the object of this invention to produce this result, and the result is a desirable one, because it is very inconvenient for the driver in the constructions which have heretofore been used to move his hand lever to the "reverse" position, since it usually requires that he bend forward in his seat.

The present improvement resides in the mechanism intermediate of the hand lever and the sliding gears,—this intermediate mechanism being that which commonly goes by the name of selective mechanism.

The invention consists in the construction and combination of parts which are hereinafter described and definitely pointed out in the claims.

Figure 4:
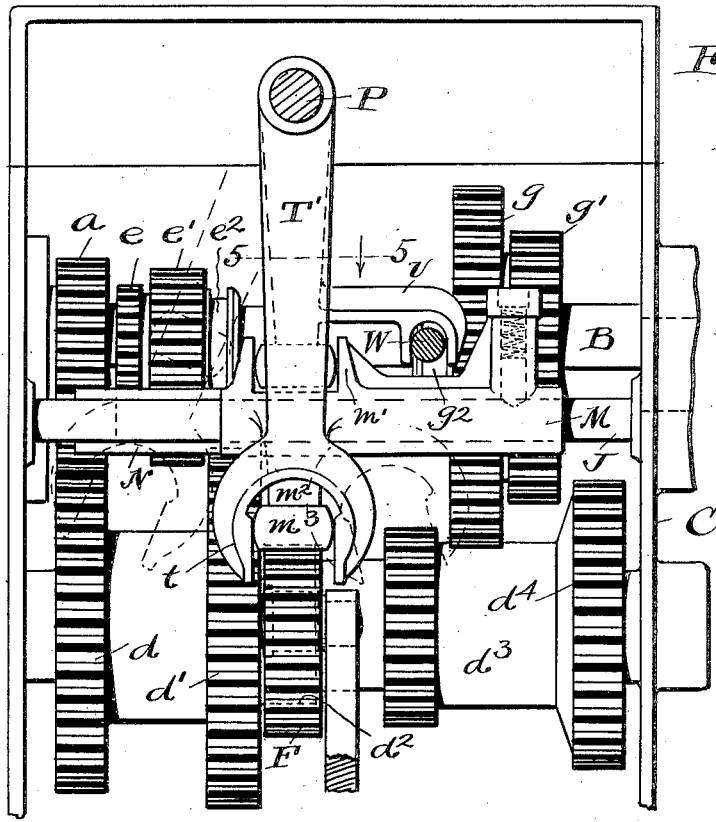
Figure 5:
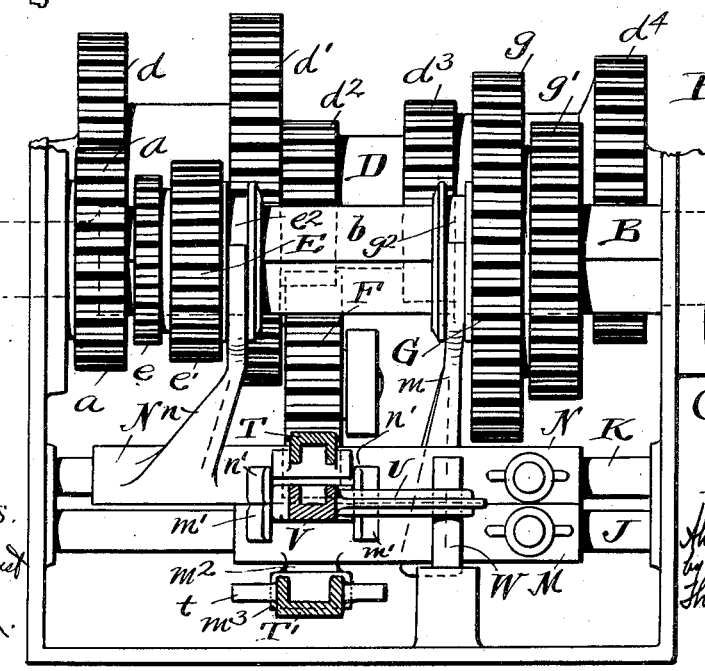

Figure 1 is a sectional side elevation of transmission mechanism embodying the invention,—the plane of the section being shown by line 1—1 on Fig. 2. Fig. 2 is a transverse sectional view on line 2—2 of Fig. 1. Fig. 3 is a transverse sectional view on line 3—3 of Fig. 1. Fig. 4 is a view of the gears from the right side of Fig. 2; and Fig. 5 is a sectional plan of the mechanism shown in Fig. 4, the section being in the plane of line 5—5 on Fig. 4.

Referring to the parts by letters A represents the driving shaft which may be the crank shaft of the engine; B represents the driven shaft,—that is to say, the shaft which is to be turned at various rates relative to the driving shaft, and in the same or the opposite direction. These two shafts are alined.

D represents the intermediate shaft which is parallel with the two shafts A and B. In the particular construction shown, this shaft D is a quill, but this is a matter of no importance. The adjacent ends of the shafts A and B, as well as the shaft D, are all within a casing C.

An external gear $a$ fixed to the shaft A is always in mesh with a gear $d$ on the intermediate shaft, whereby the latter is always rotated when the shaft A is in rotation. Fixed to the shaft D are also the gears $d'$, $d^2$, $d^3$ and $d^4$. The part $b$ of the shaft B within the casing is squared and on this part of said shaft are two sliding gear sleeves E and G respectively. On the gear sleeve E are two gears $e$ and $e'$. The former is adapted to be slipped into and mesh with an internal gear $a'$ on the driving shaft A, while the other gear $e'$ is adapted to mesh with the gear $d'$. The gear sleeve G carries two gears, namely, the gear $g$ which is adapted to mesh with the gear $d^3$, and the gear $g'$ which is adapted to mesh with the gear $d^4$. When the operating hand lever R is in the neutral position these gear sleeves are in such positions, as shown in Fig. 1, that their gears are out of mesh with the several gears they may mesh with. By moving the gear sleeve G to the left from the position shown in Fig. 1 the gear $g$ will be caused to mesh with the gear $d^3$, and this produces the connection known as the first speed or low speed. When the said gear sleeve G is moving to the right from the position shown in Fig. 1 the gear $g'$ is caused to mesh with the gear $d^4$ and this produces what is known as the second speed connection. When the gear sleeve E is moved to the left from the position shown in Fig. 1 the gear $e$ becomes meshed with the internal gear $a'$ and this produces the third or direct connection—that is to say, a connection in which the two shafts A and B rotate at the same speed,—while moving the gear sleeve E to the right in the position shown in Fig. 1 the gears $e'$ and $d'$ are caused to mesh and this brings about the high speed connection by means of which the shaft B is driven at a higher rate than the driving shaft A.

Mounted within the casing and upon a stub shaft is an idler gear F, said shaft being placed in such position and the gear F being of such size that it lies in the plane of and will always mesh with the gear $d^2$, and may mesh with the gear $g$ when the gear sleeve G has been moved to the left from the position shown in Fig. 1, so as to carry the gear $g$ through and past the gear $d^3$. This connection is what is known as the "reverse" connection.

Within the casing C are two guide bars J and K which are located side by side, and are parallel with the shafts which have been referred to. On the guide bar J is a sliding gear shifter M, in the form of a sleeve carrying a fork $m$ which engages in the annular groove $g^2$ in the gear sleeve G. On the guide bar K is a gear shifter N in the form of a sliding sleeve having a fork $n$ which engages in the annular groove $e^2$ of the gear sleeve E. By the movement of these two gear shifters M and N along their guide rods in one direction or the other, the gear sleeves may be shifted to bring about different meshing of the gears which has been described.

In the top of the gear shifter M are two short upwardly extended arms $m'$ separated sufficiently to leave a suitable recess between them. On the upper side of the gear shifter N are two similar separated fingers $n'$ with a recess between them; and on the gear shifter M is likewise an arm $m^2$ which extends downward therefrom. On the lower end of this arm and on a horizontal axis $a$ roller $m^3$ is mounted.

P represents a rock shaft which is mounted in bearings in the removable cover $c$ of casing C, and is also capable of moving endwise in its bearings. Two coil springs $p$, $p$, surround this shaft, and are compressed, one of them between a collar $p'$ fixed to the shaft and fixed bracket Q in which the outer end of the shaft is rotatable, and the other spring is compressed between the same collar $p'$ and the end of the casing cover $c$. These springs, by their action, tend to move the shaft endwise to and yieldingly hold it in the neutral position. Attached to the outer end of the shaft P by means of a horizontal pivot $r$ is the operating hand lever R which is movable in the usual slot in a guide bracket S. The shaft and hand lever are shown in Figs. 2 and 3 in the neutral position. By moving the upper end of the lever outward the shaft P will be moved endwise to the left, and then when the lever is moved, either forward or backward, the shaft P will be rocked in one direction or the other. When the lever is moved from the neutral position inward at its outer end and then is swung forward or backward the shaft P will be moved, first endwise to the right, and then it may be rocked in one direction or the other. Fixed to this shaft within the casing are two operating arms T and T' of unequal length. Between them, loosely embracing the shaft P so that the latter may turn in the same, is a locking arm V. The endwise movement of the shaft P will cause the two operating arms and the locking arm to move with it; but the rocking of the shaft P will cause a corresponding movement of the operating arms only, the locking arm V being prevented from moving because it has a notched arm $v$ which engages with a guide bar W fixed to the casing. Now, when all the parts are in neutral position, the lower end of the locking arm is in such position that it projects into the notch between the two fingers $m'$ and the two fingers $n'$, so as to prevent any longitudinal movement of the shifters M and N. At this time the operating arm T projects a short distance into the notch between the fingers $n'$, and the roller $m^3$ on the downwardly projecting arm $m^2$ a slight distance into the fork $t$ on the lower end of the operating arm T'. If, now, by the manipulation of the hand lever as shown in Figs. 2 and 3, the shaft P is moved to the left, the locking arm will move with it, and will move out of engagement with the fingers $m'$ and will occupy a position wholly between the fingers $n'$ at the same time arm T will move out of engagement with fingers $n'$, and the arm T' into fuller engagement with the roller $m^3$ on the shifter M. When, now, the shaft is rocked in one direction the gear shifter M will be moved, and it will move the gear sleeve G so as to cause the intermeshing of the gears $g$ and $d^3$, thus producing low speed connection. If moved still farther in the same direction, it will cause the intermeshing of the gear $g$ with the idler gear F, and this will produce the reverse connection. If the shaft is rocked in the opposite direction from the neutral point, it will cause the intermeshing of the gear $g'$ with the gear $d^4$, and this will produce the second speed connection. While these motions are permissible, it is quite evident that the locking arm V between the fingers $n'$ will effectually prevent any movement, accidental or otherwise, of this shifter N, and consequently of the gear sleeve E. But, if the shaft P be moved to the right, this locking arm will pass wholly between the fingers $m'$ and out of engagement with the fingers n' and the operating arm T' will move out of engagement with arm $m^2$, so that when now shaft P is rocked the shifter N will be moved in one direction or the other, and thereby gear sleeve E will be moved to produce either the direct or high speed connections. It will be noticed, however, that the operating arm T' is longer than the operating arm T, and that the movements of the sleeve G, especially that movement which carries the gear $g$ into engagement with the idler F (lying in the same plane as gear $d^2$) to bring about the "reverse" is much longer than are the movements of the sleeve E. Now all of these movements originate with the hand lever R which rocks the shaft P and the operating arms T and T' which are rigidly secured upon it and move the sleeves E and G through their respective shifters N and M. It is desirable to keep the range of movement of the hand lever within the limit of easy reach of the operator and not compel him to stretch for distant movements. When the sleeve E is moved through the operating arm T and shifter N the hand lever swings through a limited arc that is within easy reach of the operator. The sleeve G however has a greater range of movement, especially toward the "reversing" engagement, and in order to accomplish this without materially increasing the throw of the hand lever R, the operating arm T', (which actuates the sleeve G through the shifter M) is made longer than the arm T, and is therefore adapted to impart a greater movement to the sleeve G for any swing of the hand lever through a given arc. By the use of these operating arms of differing lengths, movements of different lengths can be imparted to their respective shifters and gear sleeves without materially changing the arcual range of movement of the hand lever.

Having described my invention, I claim:

1. In mechanism for shifting gears, the combination of two sliding gear sleeves adapted to move longitudinally in both directions from the neutral positions, one having a greater range of movement than the other, and two gear shifters which respectively engage said gear sleeves, with a rock shaft which is movable endwise, and two operating arms of unequal length fixed to said rock shaft and adapted, through its rocking movements, respectively to move said gear shifters, the longer operating arm engaging that gear shifter which has the greater range of movement.

2. In mechanism for shifting gears, the combination of two gear sleeves, two sliding gear shifters which respectively engage said gear sleeves, a rock shaft which is also capable of endwise movement, two operating arms of different lengths fixed to said shaft for engagement respectively with said gear shifters, a locking arm which may engage with both or either of said gear shifters depending upon its position, means compelling said locking arm to move in unison with the rock shaft when it is moved endwise in either direction, and means preventing the rocking of said locking arm.

In testimony whereof, I hereunto affix my signature in the presence of two witnesses.

ALANSON P. BRUSH.

Witnesses:
O. W. MACKER,
E. L. THURSTON.